United States Patent
Cottrill

[19]

[11] Patent Number: 6,006,278

[45] Date of Patent: Dec. 21, 1999

[54] METHOD AND SYSTEM FOR IMPORTING REMOTE FUNCTIONS TO A NETWORK COMPUTER

[75] Inventor: Scottie L. Cottrill, The Colony, Tex.

[73] Assignee: Electronic Data Systems Corporation, Plano, Tex.

[21] Appl. No.: 08/896,724

[22] Filed: Jul. 18, 1997

[51] Int. Cl.[6] .............................. G06F 9/44; G06F 9/45; G06F 13/00

[52] U.S. Cl. .................... 709/300; 709/304; 709/305; 709/200; 709/219; 395/705; 395/706

[58] Field of Search .................... 709/203, 303, 709/304, 305, 219, 227, 200; 395/706, 705

[56] References Cited

U.S. PATENT DOCUMENTS

| | | | |
|---|---|---|---|
| 5,437,006 | 7/1995 | Turski ................................ | 707/503 |
| 5,465,351 | 11/1995 | Lemmo .............................. | 709/305 |
| 5,481,706 | 1/1996 | Peek .................................. | 710/200 |
| 5,497,463 | 3/1996 | Stein et al. ........................ | 709/203 |
| 5,519,833 | 5/1996 | Agranat et al. ................... | 709/300 |
| 5,606,493 | 2/1997 | Duscher et al. ................... | 709/202 |
| 5,625,823 | 4/1997 | Debenedictis et al. ............ | 709/305 |
| 5,687,373 | 11/1997 | Holmes et al. .................... | 709/302 |
| 5,768,511 | 6/1998 | Galvin et al. ..................... | 709/203 |
| 5,778,228 | 7/1998 | Wei .................................... | 709/304 |
| 5,802,367 | 9/1998 | Held et al. ........................ | 709/305 |
| 5,838,921 | 11/1998 | Speeter .............................. | 709/227 |
| 5,887,172 | 3/1999 | Vasudevan et al. ............... | 709/304 |

*Primary Examiner*—Ahmad F. Matar
*Assistant Examiner*—William D. Thomson
*Attorney, Agent, or Firm*—L. Joy Griebenow; Baker & Botts L.L.P.

[57] ABSTRACT

A computer network (10) is provided that includes first and second computer systems (12 and 14). The first computer system (12) includes a software application (24) having a function call (26). The second computer system (14) communicates with the first computer system (12) and includes a function (34) corresponding to the function call (26). A function importation engine (28) identifies the function call (26) and copies the function (34) from the second computer system (14) to the first computer system (12). The function importation engine (28) enables the first computer system (12) to operate in a stand-alone configuration.

17 Claims, 1 Drawing Sheet

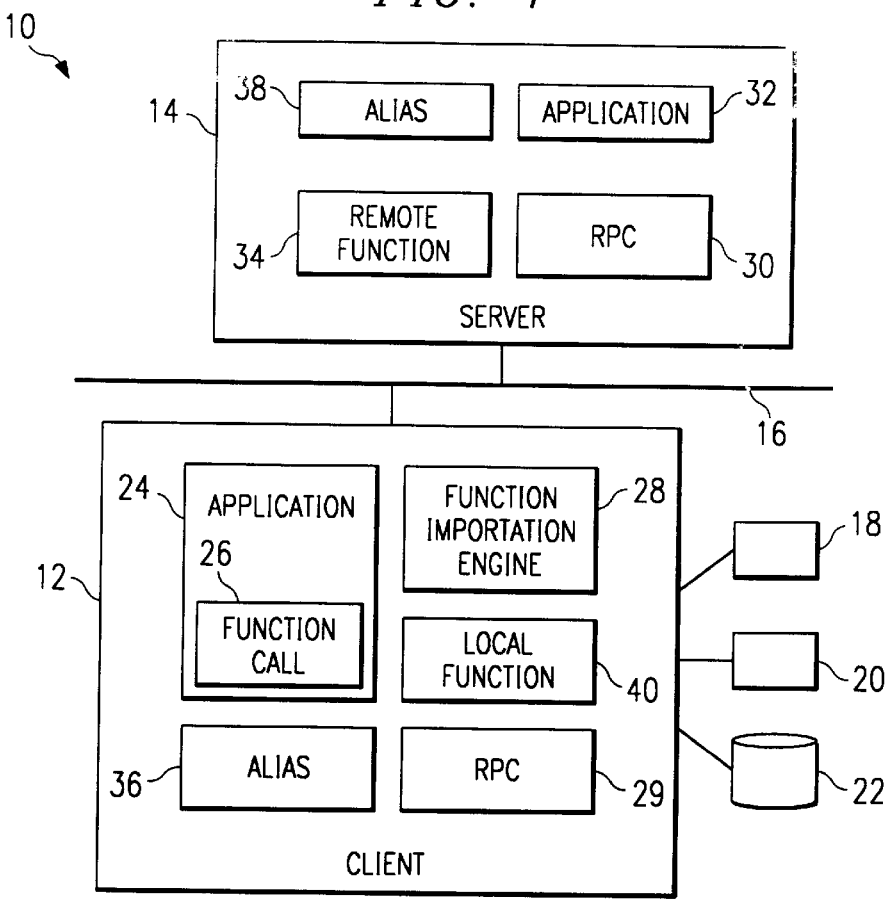
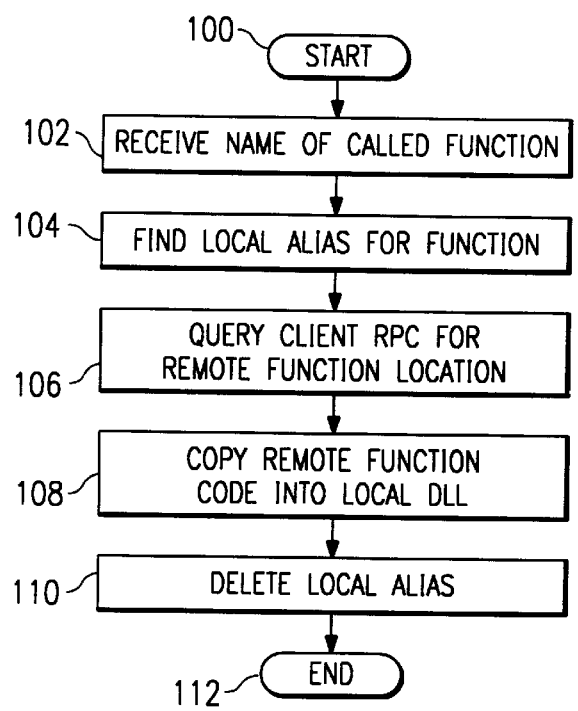

METHOD AND SYSTEM FOR IMPORTING REMOTE FUNCTIONS TO A NETWORK COMPUTER

TECHNICAL FIELD OF THE INVENTION

This invention relates generally to the field of computer systems and more particularly to a system and method for importing remote functions to a network computer.

BACKGROUND OF THE INVENTION

In a computer network environment, it is often advantageous to implement a remote procedure call (RPC) which allows an application on one computer to execute a specific function on another computer in the network. This allows a commonly used function to be stored and executed on only one computer in the network.

However, one result of having remote procedure calls in an application is that the application will not function properly if the computer is disconnected from the network. Occasionally, a user may wish to operate the computer in a stand-alone configuration, for example when traveling, or when the network is down due to maintenance or system failures. In this situation, the user is not able to fully utilize the application because of the remote procedure calls.

SUMMARY OF THE INVENTION

From the foregoing, it may be appreciated that a need has arisen for a method and system for enabling a software application to operate on a local computer system independently of a computer network. In particular, a need has arisen for a method and system for importing remote functions to a network computer. In accordance with the present invention, a function importation system and method are provided that substantially eliminate or reduce disadvantages and problems associated with conventional computer network systems.

According to an embodiment of the present invention, there is provided a computer network that includes first and second computer systems. The first computer system includes a software application having a function call. The second computer system communicates with the first computer system, and includes a function corresponding to the function call. A function importation engine identifies the function call and copies the function from the second computer system to the first computer system.

The present invention provides various technical advantages over conventional computer network systems. For example, one technical advantage is that the function importation engine enables the first computer system to operate in a stand-alone configuration. Another technical advantage is that the first computer system may be utilized in locations where network connections are unavailable. Other technical advantages are readily apparent to one skilled in the art from the following figures, descriptions and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 is a block diagram of an exemplary computer network constructed in accordance with the invention; and FIG. 2 is a flowchart illustrating a method for importing remote functions to a network computer in accordance with the invention.

DETAILED DESCRIPTION OF THE INVENTION

Referring to FIG. 1, a block diagram of a computer network 10 constructed in accordance with the present invention is shown. Network 10 includes a client computer system 12 and a server computer system 14 connected by a network bus 16. Client computer system 12 and server computer system 14 may each comprise a workstation, IBM-compatible personal computer, or other computer system.

Client computer system 12 includes an input system 18, an output system 20 and a mass storage system 22. Input system 18 is operable to receive input from a user of client computer system 12, and may comprise a keyboard, a pointing device such as a mouse or touchpad, or other input devices. Output system 20 is operable to produce audiovisual output for a user of client computer system 12, and may comprise a monitor, speakers, printer or other output devices. Mass storage system 22 is operable to store and retrieve data, and may comprise a hard disk drive, floppy disk drive, CD-ROM drive, or other mass storage device.

Client computer system 12 includes a client application 24 with at least one function call 26. Client application 24 may comprise a plurality of linked files. Client application 24 may, for example, be stored on mass storage device 22. When client application 24 is loaded from mass storage device 22, then it resides in random access memory (RAM) within client computer system 12. Alternatively, client application 24 may be stored in a read only memory (ROM) device or other memory device. Client computer system 12 also includes a function importation engine 28, a remote procedure call (RPC) compiler 29, and other features which will be described more fully below.

A portion of an exemplary client application 24 including function call 26 is provided in Example A. The exemplary client application is written in C++ source code. In this example, client application 24 includes an "Account" method which includes a "debit" function call 26.

EXAMPLE A

```
void Account( )
{
    int amount;
    /* Process Account */
    .
    .
    .
    amount=10;
    /* call debit routine */
    debit (amount);
}
```

Server computer system 14 comprises a remote procedure call (RPC) compiler 30 and a server application 32 utilizing a function 34. Server application 32 may be, for example, an account management application that implements various account management functions. One of those functions is function 34, which may be a debit function as partially represented in Example B. For example, server application 32 may periodically calculate interest earned by various accounts, and may utilize debit function 34 to add the calculated interest to the accounts. Debit function 34 may be part of server application 32, or may be linked with server application 32 prior to execution.

EXAMPLE B

```
void debit(int amount)
{
    /* process debit amount */
    .
    .
    .
}
```

In this example, client computer system 12 may be an account manager's personal computer, operable to open accounts, check balances and perform various other account management functions. Thus, function call 26, as previously discussed, may be a debit function call that is used when the account manager receives a deposit for an account.

Various advantages may be achieved by having only one debit function 34 which may be utilized by all of the computers in network 10. For example, if all computers use a single debit function 34, then a change in account management procedure may be effected by editing debit function 34, without the need to edit a debit function on each computer. In addition, when commonly used functions such as debit function 14 are located on a single computer system that has a large processing capacity, some of the processing load is taken away from other computers such as client computer system 12, which may have a lower processing capacity. Various other advantages inherent in distributed computing systems will be apparent to those skilled in the art of computer networks.

The process of making debit function 34 available to client computer system 12 is simplified and automated by RPC compilers 29 and 30. RPC compilers 29 and 30 may be executed by a user who specifies that debit function 34 must be made available to client computer system 12. RPC compiler 29 then creates a local alias function call 36 on client computer system 12, as shown in Example C. Local alias function call 36 may, for example, take the form of a dynamic-link library (DLL) which may be linked to client application 24 at execution.

EXAMPLE C

```
void debit(int an_amount)
{
    /* call remote procedure equivalent */
    remote_debit (an_amount);
}
```

RPC compiler 30 creates a remote alias function call 38 on server computer system 14, as shown in Example D. Remote alias function call 38 may take the form of a DLL which may be linked to server application 24 at execution.

Referring to Example C, it will be appreciated that local alias function call 36 created by RPC compiler 29 does not perform any steps other than to call another function, in this case a function named "remote_debit." This "remote_debit" function is provided on server computer system 14 by the remote alias function call 38 created by RPC compiler 30. Thus, when the "debit" function is called by function call 26 of client application 24, the local alias function call DLL 36 is executed. This results in a "remote_debit" function call, for which RPC compiler 29 is consulted.

RPC compiler 29 indicates that the "remote_debit" function may be found on server computer system 14. As a result, the remote alias function call DLL 38 is executed. Referring to Example D, it will be appreciated that the execution of remote alias function call DLL 38 results in a "debit" function call. This "debit" function call causes debit function 34 to be performed.

EXAMPLE D

```
void remote_debit(int an_amount)
{
    /* call target application procedure */
    debit(an_amount);
}
```

While the above-described remote function call procedure has many advantages in a network environment, it is useful to be able to disconnect client computer system 12 from network 10 while allowing applications such as client application 24 to execute normally. For example, if client computer system 12 is a laptop computer, an account manager or other user of client computer system 12 may wish to perform work while on an airplane or in a remote location where a secure connection to network 10 is not readily available. It will be appreciated that the remote function call procedure created by RPC compilers 29 and 30 will render client application 24 inoperable if client computer system 12 is disconnected from network 10.

Thus, a function importation engine 28 in accordance with the present invention is provided. Function importation engine 28 enables client application 24 to execute properly when client computer system 12 is in a stand-alone configuration. This is accomplished by importing to client computer system 12 the source code contained in, for example, debit function 34 on server computer system 14.

Function importation engine 28 is shown for illustrative purposes as part of client computer system 12. It will be appreciated from the following description that function importation engine 28 may alternatively be located on server computer system 14 or at any other location in network 10. It will also be understood that, if function importation engine 28 is not implemented on client computer system 12, then function importation engine 28 cannot properly be said to "import" functions to client computer system 12, and a different name would perhaps be appropriate. However, for illustrative purposes, function importation engine 28 is shown as part of client computer system 12 and is appropriately referred to as a function importation engine.

Referring to FIG. 2, a flowchart illustrating the operation of function importation engine 28 is shown. A user of client computer system 12 may execute function importation engine 28 using a command that may include as a parameter the name of the function 34 that the user wishes to import to client computer system 12.

When executed, function importation engine 28 performs a process that begins at step 100 and proceeds to step 102. If the user did not specify in the execution command the function 34 to be imported, then function importation engine 28 prompts the user to enter the name of the function at step 102. Function importation engine 28 may also prompt the user to identify the specific application 24 in which function call 26 appears.

In an alternative embodiment of the invention, the user need not specify a function to be imported to client computer system 12. Instead, the user need only identify the client application 24 which the user wishes to operate on client computer system 12 is a stand-alone configuration. In this embodiment, function importation engine 28 is operable at step 102 to search client application 24 for remote function calls such as function call 26. Steps 102 through 110 in FIG. 2 are then performed for each remote function call identified in client application 24.

When the function has been identified at step 102, the method proceeds to step 104, where function importation engine 28 searches for local alias function call 36 and determines the local alias being used for function call 26. In this example, function importation engine 28 determines that "remote$_{13}$ debit" is being used as an alias for the "debit" function call 26, as shown in Example C.

At step 106, function importation engine 28 refers to RPC compiler 29 to determine where in network 10 the "remote_debit" function is defined. In this example, RPC compiler 29 indicates that client computer system 14 includes the "remote_debit" function.

Function importation engine 28 "knows" that the "remote_debit" function call was created merely as an alias for the originally-specified "debit" function, and therefore assumes that a "debit" function will be defined at client computer system 14. Thus, proceeding to step 108, function importation engine 28 searches for debit function 34 on client computer system 14 and reads the source code of that function. At steps 108 and 110, the source code of debit function 34 is copied into client application 24, as shown in Example E, or into a DLL or other file 40 that may be linked to client application 24 prior to execution. For example, function importation engine 28 may delete the existing content of local alias function call DLL 36 and replace it with the source code of debit function 34 to create debit function 40. Alternatively, at step 108, a new DLL 40 may be created with the source code of debit function 34, while at step 110 local alias function call 36 is deleted.

EXAMPLE E

```
void Account( )
{
    int amount;
    .
    .
    .
    amount=10;
    /* call debit routine */
    debit (amount);
    .
    .
    .
}
void debit(int amount)
{
    /*process debit amount */
    .
    .
    .
}
```

The execution of function importation engine 28 ends at step 112. Client computer system 12 may then be disconnected from network 10. If necessary, client application 24 may be recompiled or relinked prior to execution to include debit function 40. When executed, client application 24 will function normally using debit function 40, without referring to client computer system 14.

While the invention has been particularly shown and described by the foregoing detailed description, it will be understood by those skilled in the art that various other changes in form and detail may be made without departing from the spirit and scope of the invention which is solely defined by the appended claims. In particular, it will be understood by those skilled in the art that, while reference has been made to particular network configurations, operating systems, applications and file formats, the principles of the invention can be applied more generally to other types of computer systems, applications and formats.

What is claimed is:

1. A computer network, comprising:

a first computer system including a software application having a function call, an alias corresponding to the function call, and a remote procedure call compiler;

a second computer system in communication with the first computer system, the second computer system having a function corresponding to the alias; and a function importation engine operable to enable the first computer system to operate independently from the second computer system, the function importation engine being operable to identify the function call, determine the alias of the function call, query the remote procedure call compiler to identify the function of the second computer system corresponding to the alias, find the function of the second computer system, and copy the function from the second computer system to the fist computer system in response to the identification of the function call, wherein the remote procedure call compiler is operable to provide an identification of the function of the second computer system in response to a query by the function importation engine.

2. The computer network of claim 1, wherein the first computer system further comprises the function importation engine.

3. The computer network of claim 1, wherein the alias of the first computer system comprises a dynamic-link library.

4. The computer network of claim 1, wherein the second computer system further comprises an alias cross-referencing the alias of the first computer system to the function of the second computer system.

5. The computer network of claim 1, wherein the second computer system further comprises an application operable to utilize the function of the second computer system.

6. The computer network of claim 1, wherein the function importation engine is further operable to create a dynamic-link library including the function copied from the second computer system.

7. A method for enabling a software application to operate on a local computer system independently of a computer network, comprising the steps of:

identifying a function call in the software application;

determining an alias corresponding to the function call;

querying a remote procedure call compiler on the local computer system to identify a function corresponding to the alias;

determining the location of the function on a remote computer system of the computer network;

reading from the remote computer system the function corresponding to the alias; and copying the function from the remote computer system to the local computer system.

8. The method of claim 7, wherein the step of identifying the function call comprises the step of receiving user input identifying the function call.

9. The method of claim 7, wherein the step of identifying the function call comprises the step of searching the software application for remote function calls.

10. The method of claim 7 and further comprising the step of deleting from the local computer system the alias of the function call.

11. The method of claim 7, wherein the step of copying the function from the remote computer system to the local computer system comprises the steps of:

deleting from the local computer system a first dynamic-link library having an alias of the function call;

creating a second dynamic-link library; and copying the function into the second dynamic-link library.

12. The method of claim 7, wherein the step of copying the function from the remote computer system to the local computer system comprises the step of over-writing a dynamic-link library including an alias of the function call with code representing the function.

13. The method of claim 7, wherein the step of copying the function from the remote computer system to the local computer system comprises the step of copying the function into the software application.

14. A method for executing a software application on a local computer system independently of a computer network, the software application including a function call, the method comprising the steps of:

identifying the function call of the software application;

reading from the local computer system an alias of the function call;

querying a remote procedure call compiler on the local computer system to identify a function corresponding to the alias;

determining the location of the function on a remote computer system of the computer network;

reading from the remote computer system on the computer network the function corresponding to the alias of the function call;

copying the function from the remote computer system to the local computer system;

disconnecting the local computer system from the network; and executing the software application.

15. The method of claim 14 and further comprising the step of deleting from the local computer system the alias of the function call.

16. The method of claim 14, wherein the step of identifying the function call comprises the step of receiving user input identifying the function call.

17. The method of claim 14, wherein the step of identifying the function call comprises the step of searching the software application for remote function calls.

* * * * *